United States Patent
Rodrigues

(10) Patent No.: US 10,223,062 B1
(45) Date of Patent: *Mar. 5, 2019

(54) METHOD AND APPARATUS OF CAPTURING A SCREEN IMAGE OF A REMOTELY MANAGED MACHINE

(71) Applicant: OPEN INVENTION NETWORK LLC, Durham, NC (US)

(72) Inventor: Derek Rodrigues, Ojai, CA (US)

(73) Assignee: OPEN INVENTION NETWORK LLC, Durham, NC (US)

(*) Notice: Subject to any disclaimer, the term of this patent is extended or adjusted under 35 U.S.C. 154(b) by 8 days.

This patent is subject to a terminal disclaimer.

(21) Appl. No.: 15/805,946

(22) Filed: Nov. 7, 2017

Related U.S. Application Data

(63) Continuation of application No. 13/075,283, filed on Mar. 30, 2011, now Pat. No. 9,811,304.

(51) Int. Cl.
 *G06F 3/14* (2006.01)
 *H04L 29/08* (2006.01)
 *G06F 9/451* (2018.01)

(52) U.S. Cl.
 CPC .......... *G06F 3/1454* (2013.01); *G06F 9/452* (2018.02); *H04L 67/025* (2013.01); *G09G 2340/02* (2013.01)

(58) Field of Classification Search
 None
 See application file for complete search history.

(56) References Cited

U.S. PATENT DOCUMENTS

| | | | | |
|---|---|---|---|---|
| 5,684,952 A * | 11/1997 | Stein | G06F 3/1454 | 434/336 |
| 6,601,047 B2 * | 7/2003 | Wang | G06Q 20/04 | 705/27.1 |
| 7,111,060 B2 * | 9/2006 | Araujo | H04L 63/0272 | 709/222 |
| 7,933,955 B2 * | 4/2011 | Khalatian | G06F 3/038 | 709/203 |
| 7,996,464 B1 * | 8/2011 | Wang | G06Q 10/107 | 709/204 |
| 8,244,806 B2 * | 8/2012 | Arthur | G06F 11/3664 | 709/204 |
| 8,336,029 B1 * | 12/2012 | McFadden | G06F 9/45516 | 717/100 |
| 8,397,167 B2 * | 3/2013 | West | H04L 41/22 | 709/217 |
| 8,589,800 B2 * | 11/2013 | Kominac | H04L 67/02 | 715/740 |
| 8,612,628 B1 * | 12/2013 | Padlia | G06F 9/452 | 709/246 |

(Continued)

*Primary Examiner* — Lynn D Feild
*Assistant Examiner* — Vadim Savenkov

(57) ABSTRACT

Disclosed are an apparatus and method of remotely communicating with a managed machine. One example method may include identifying the managed machine operating in a communication network, transmitting a connection establishment message to the managed machine over the communication network, and receiving an acceptance message from the managed machine. The method may also include requesting a screen capture of present operating conditions of the managed machine, and receiving the screen capture formatted in a compressed format. The administrator may be able to receive and view the screen capture via a compressed thumbnail format.

20 Claims, 6 Drawing Sheets

(56) References Cited

U.S. PATENT DOCUMENTS

| | | | | |
|---|---|---|---|---|
| 2004/0049547 | A1* | 3/2004 | Matthews | G09B 7/00 709/206 |
| 2005/0052685 | A1* | 3/2005 | Herf | H04L 29/06 358/1.15 |
| 2006/0130124 | A1* | 6/2006 | Richardson | H04L 67/08 726/3 |
| 2007/0300179 | A1* | 12/2007 | Friedlander | G06F 9/45512 715/781 |
| 2007/0300291 | A1* | 12/2007 | Bomgaars | H04L 12/2856 726/3 |
| 2008/0215722 | A1* | 9/2008 | Hogaboom | H04L 29/06 709/224 |
| 2008/0275971 | A1* | 11/2008 | Pretlove | H04L 67/42 709/222 |
| 2009/0037581 | A1* | 2/2009 | Richardson | H04L 67/08 709/224 |
| 2010/0055656 | A1* | 3/2010 | Lemmers | G06F 19/3418 434/262 |
| 2010/0138748 | A1* | 6/2010 | Sankararao | H04L 67/08 715/733 |
| 2011/0154219 | A1* | 6/2011 | Khalatian | G06F 3/1462 715/751 |
| 2011/0276619 | A1* | 11/2011 | Khan | H04L 67/141 709/203 |
| 2013/0198336 | A1* | 8/2013 | Kridlo | H04L 67/06 709/219 |

* cited by examiner

METHOD AND APPARATUS OF CAPTURING A SCREEN IMAGE OF A REMOTELY MANAGED MACHINE

CROSS-REFERENCE TO RELATED APPLICATIONS

This application is a continuation of U.S. patent application Ser. No. 13/075,283, entitled "METHOD AND APPARATUS OF CAPTURING A SCREEN IMAGE OF A REMOTELY MANAGED MACHINE", filed Mar. 30, 2011, now issued U.S. Pat. No. 9,811,304, issued Nov. 7, 2017, the contents of which is hereby incorporated by reference in its entirety.

TECHNICAL FIELD OF THE INVENTION

This invention relates to a method and apparatus of accessing a remotely managed machine via an administrator machine, and more specifically, capturing a screen image of the remotely managed machine.

BACKGROUND OF THE INVENTION

User workstations or managed machines (computing devices) operate in a data communication network by communicating with other managed machines and/or administrative machines. Regardless of the status of the machine, the administrative machines operate to support the ongoing communication and applications operating on the managed machines.

Accessing and executing commands on a managed machine through an administrative interface is a common method of updating, controlling, debugging and ensuring the continued seamless operation of the managed machine. However, certain challenges are presented with the advent of varying operating systems, control interfaces and other commonalities of the managed machines operating on a data communication network. For example, various applications used by administrators to manage network computing devices often rely on a web-based browser application to engage the administrator with certain options and simple execution of administrative actions. In addition, feedback communications between the administrative machine and the managed machine(s) may require a secure connection and other communication features prior to authorizing administrative access to managed machines.

SUMMARY OF THE INVENTION

One embodiment of the present invention may include a method of remotely communicating with a managed machine. The method may include identifying the managed machine operating in a communication network, transmitting a connection establishment message to the managed machine over the communication network, and receiving an acceptance message from the managed machine. The method may also include requesting a screen capture of present operating conditions of the managed machine, and receiving the screen capture formatted in a compressed format.

Another example embodiment of the present invention may include an apparatus configured to remotely communicate with a managed machine. The apparatus may include a processor configured to identify the managed machine operating in a communication network, and a transmitter configured to transmit a connection establishment message to the managed machine over the communication network. The apparatus may include a receiver configured to receive an acceptance message from the managed machine. The processor may be further configured to request a screen capture of present operating conditions of the managed machine, and receive the screen capture formatted in a compressed format.

DETAILED DESCRIPTION OF THE INVENTION

Figure 1A:
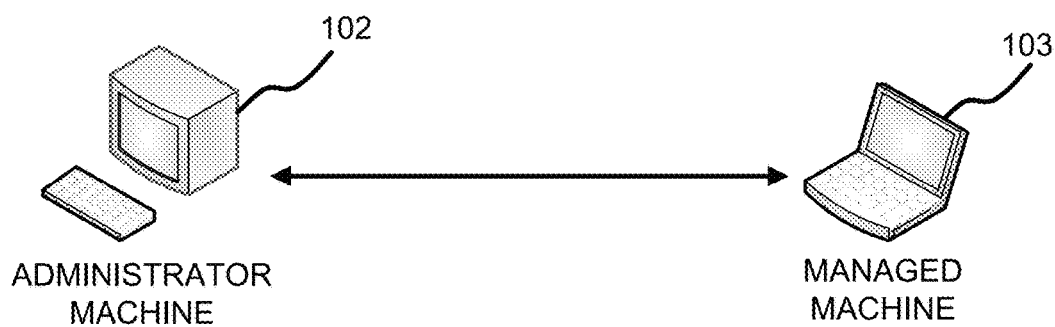
FIGS. 1A and 1B illustrate example network configurations, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, an administrator may be any information technology (IT) system administrator, IT service provider, and/or computer owner/operator who provides administrative functions to the computer devices, connections and other network resources. A managed machine may be any network-connected computer device managed by the administrator. The managed machines may be connected directly to the administrator's machine, or, over a remote network connection.

An administrator application may be a web-based application that permits the administrator to manage one or more remote managed machines. A secure network channel may be setup and established between the administrator machine and the remote managed machine via the administrator application. The secure network channel may provide connections over which data packets may be exchanged. The network channel may pass through a wide area network (WAN) (e.g. the Internet) or through a private local area network (LAN).

A server process may be an application that includes a process running on the remote managed machine. The server process accepts connections from the administrator application and assists with setting up a channel and transmitting and receiving commands and data. An administrator plug-in may be a browser plug-in operating in the context of the administrator application that connects with and interacts with the server process of the managed machine over the existing network channel.

FIG. 1A illustrates an example network communication path between a managed machine and an administrator machine, according to example embodiments of the present invention. Referring to FIG. 1A, an administrator machine 102 is in communication with a managed machine 103. The communication path may be over a WAN, such as, the Internet, or a LAN. The administrator machine 102 may be a server, computer or other computing device capable of providing a user interface to the administrator. The managed machine 103 may be a laptop, computer, personal digital assistant, smart phone or any other computer network compatible device capable of establishing a communication path or secure channel 110 with the administrator machine 102.

Figure 1B:
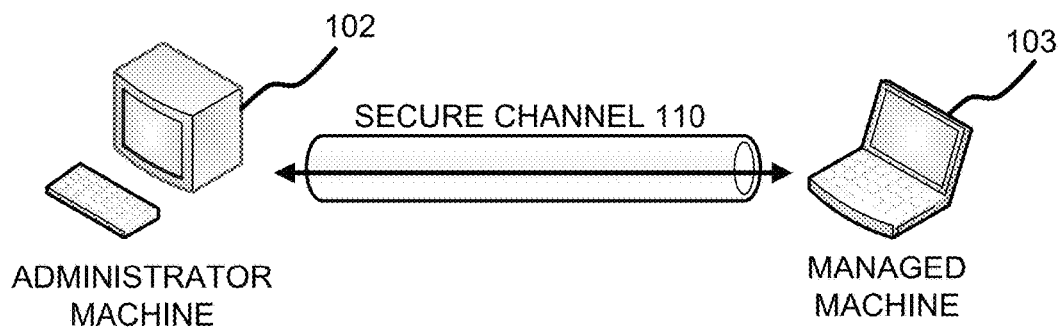

FIG. 1B illustrates an example network communication path between a managed machine 103 and administrator machine 102 that includes an established secure channel 100, according to example embodiments of the present invention. Referring to FIG. 1B, the administrator initiates a connection via a secure channel to the remote managed machine 103. The server process running on the managed machine accepts and acknowledges the connection establishment by transferring an acceptance message back to the administrator application. A secure connection may then be established between the manage machine 102 and the administrator machine 102.

Figure 2:
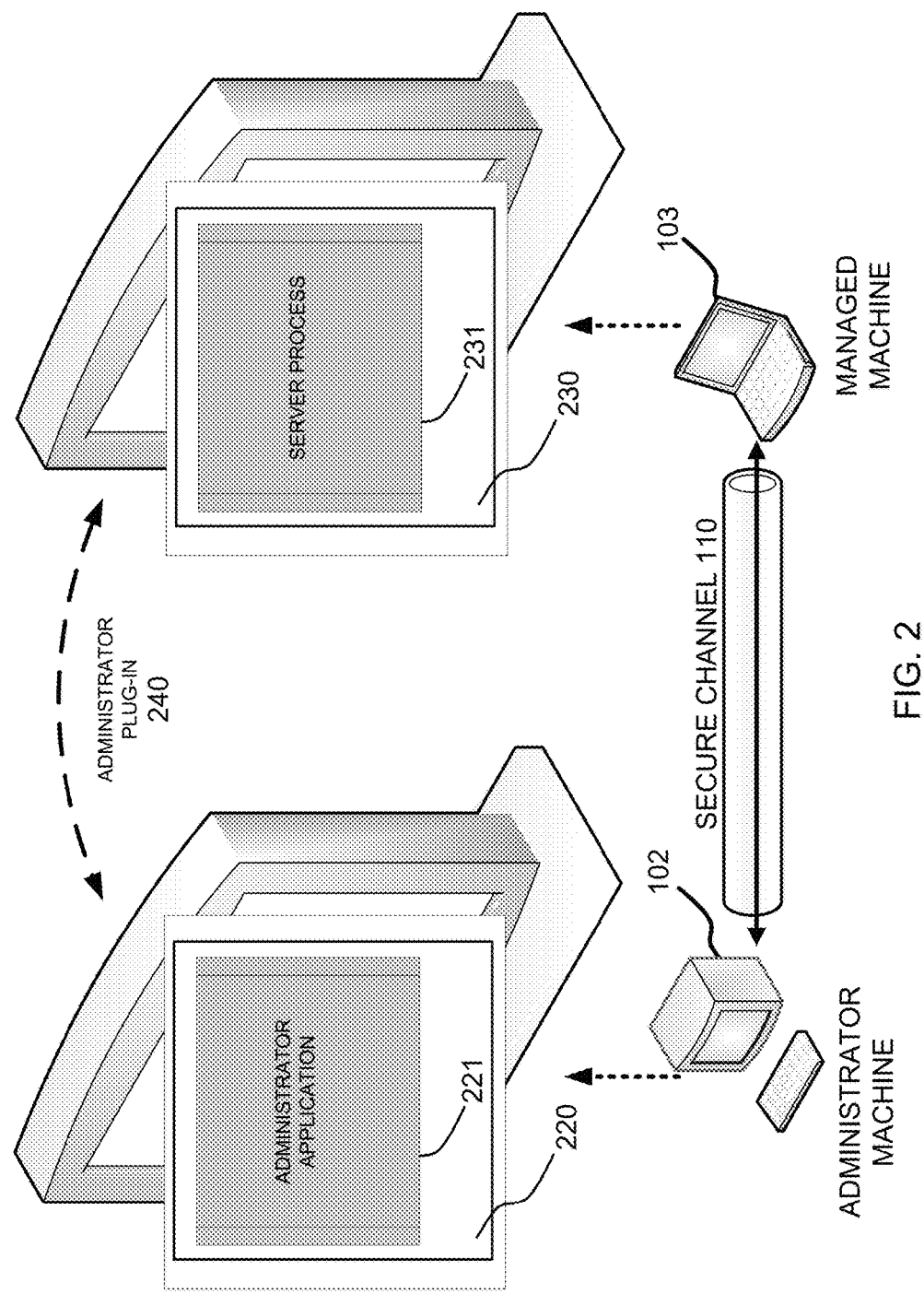
FIG. 2 illustrates an example application communication session, according to an example method of operation of the present invention.

One example method of communicating between the administrator machine 102 and the managed machine 103 is described in detail below with reference to FIG. 2. Referring to FIG. 2, the administrator machine may include an administrator application 221 of the administrator's user interface 220. An administrator plug-in 240 may be executed and run in a web browser of the user interface 220 on the administrator machine 102. The web browser may establish a connection through a proprietary secure channel 110 to a server process 231 running on the application desktop 230 of the managed machine 103.

In operation, the administrator 102 browses for a particular managed machine 103 viewable from the administrator application 221. The administrator plug-in initiates a connection via a secure channel to a server process 231 of the remote managed machine 103. The server process 231 running on the managed machine accepts and acknowledges the connection establishment by transferring an acceptance message back to the administrator application 221. After session establishment, the administrator may receive a notification or web browser-based indicator that commands may be received by the managed machine 103. The administrator may then enter a launch process to be executed on the managed machine 103.

Figure 3:
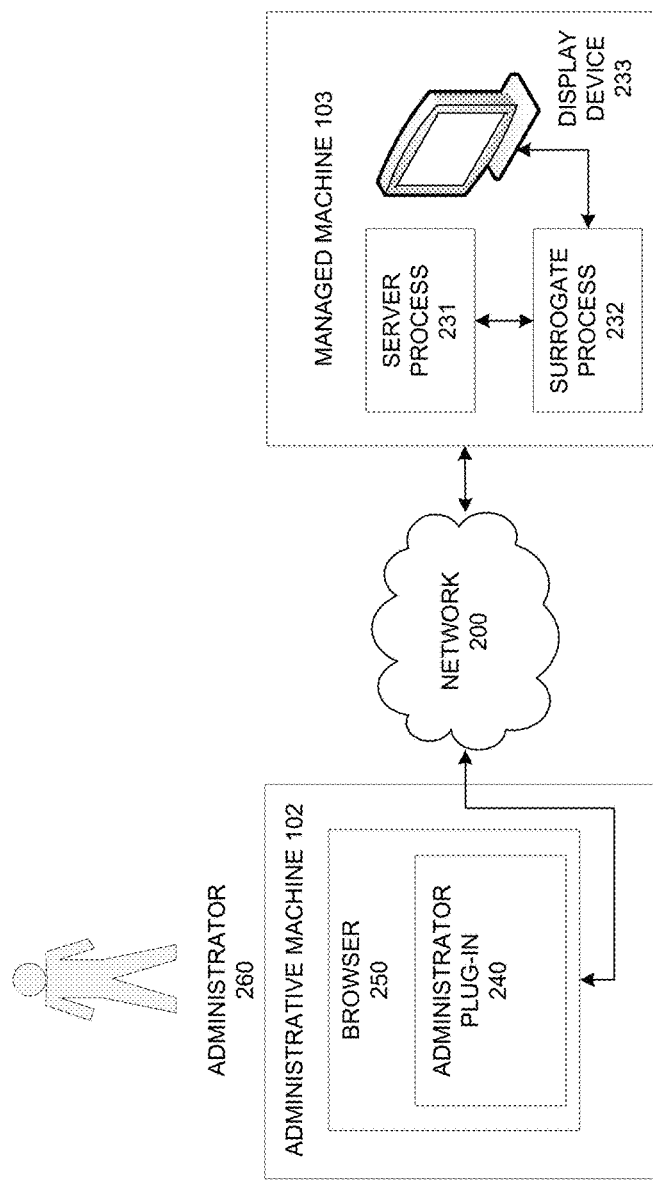
FIG. 3 illustrates an example system diagram, according to an example method of operation of the present invention.

FIG. 3 illustrates an example system diagram of the administrator establishing a connection and launching a surrogate process on the managed machine, according to an example embodiment. Referring to FIG. 3, one example surrogate process may include obtaining a thumbnail image screen capture of the remote managed machine 103 over the secure network channel 110, and rendering the obtained thumbnail image in a browser web application.

In FIG. 3, like reference numerals refer to like components illustrated in other drawings. The administrator 260 interfaces with the administrator machine 102 to access a web browser 250 linked to an administrator plug-in 240. The administrator 260 may communicate across a network 200 to a remotely managed machine 103. The server process 231 may be executed on the managed machine 103, and may be linked to a surrogate process 232. The managed machine 103 may be operated by a user via a display device 233 providing a current snapshot of the managed machine's present operating status.

The surrogate process 232 is a child process that may be launched by the server process 231 on the managed machine 103 whenever a thumbnail is required. The function of the surrogate process 232 is to capture a screenshot/thumbnail image of the managed machine 103. The surrogate process 232 provides a service that the server process 231 cannot perform itself since the server process 232 is running under the context of a Windows service. In current versions of Windows (e.g., more recent than XP and server 2003), services are isolated and unable to interact with any user interface, which would be required to obtain a screen capture. While the server process 231 is unable to interact with the user-interface, it can however launch a child process into whatever session is desired. The child process (the surrogate process 232) can then obtain the thumbnail image. The term 'surrogate' describes the fact that the surrogate process 232 obtains the thumbnail image on behalf of the server process 231.

The captured screen shot may be an image copy of the display driver device context for the input desktop of the interactive window station of the managed machine 103. This may be an image displaying what the user saw on their display screen at the time the capture took place. The timing of the capture or what is displayed in the capture is not really significant, other than that it displays what the user would be seeing if they were looking at the display device 233 of the managed machine 103.

In response to the administrator's input, the administrator plug-in 240 running in the browser 250 of the administrator machine 102, connects over the network 200 to the remote managed machine 103 and requests a screen capture of the present operating condition of the managed machine 103. The screen capture may be formatted as a thumbnail that is easily accessible via a selection operation performed by the administrator 260. The thumbnail may represent a compressed format of the original screen capture.

The server process 231 running on the managed machine 103 accepts and receives the request for a screen capture thumbnail image, and in turn, the server process 231 launches a surrogate process 232 to obtain the screen capture of the present operating condition of the managed machine 103. The surrogate process 232 may be pre-installed on the managed machine or installed on demand. The surrogate process 232 is responsible for obtaining the screen capture and creating a thumbnail image based on the screen capture. In response, the server process 231 sends the rendered thumbnail image back to the administrator plug-in 240 over the network 200 to the administrator machine 102. The administrator plug-in 240 renders the thumbnail image in an administrator application 400, described in detail below with reference to FIG. 4.

According to another example embodiment of the present invention, the administrator plug-in 240 operating in the browser 250 on the administrator machine 102 may open a client connection via an already established secure relay, or, a point-to-point (P2P) channel to the server process 231 running on the remote managed machine 103. The administrator plug-in 140 may then request a screen capture thumbnail image of a specific resolution (e.g., horizontal and vertical extent) and wait for a response to the request. The managed machine 103 will launch the surrogate process 232 to obtain a current image of the user's display device and send the image as a thumbnail to the administrator machine 102. Upon receiving the image, the administrator machine 102 renders the received image in the browser window 250. The administrator plug-in 240 may be responsible for periodically repeating the connection establishment, screen capture request and/or the image rendering operations described above at regular intervals to obtain up-to-date thumbnails. Once an updated screen capture is obtained it may be used to replace the original screen capture.

The server process 231 operating on the remote managed machine 103 handles each administrative request by determining the target session. For instance, a Microsoft Windows® Server may be used to obtain a first active session by excluding session "1", or if no active session is present, then by determining that active console session is less than session "2." For operating systems, such as, Windows Vista®, Windows 7®, Windows 2008 Server® and higher, the correct action may be to obtain the active console session. The server process 231 may also perform enumerating all currently running processes and find a well-known system process running in the target session (e.g. winlogon.exe). The server process 231 may also perform duplicating the primary token of the system process with a security level of "impersonate", and spawning the surrogate process 232 in the target session and running with a duplicated token to perform the screen capture operation. As a result, the thumbnail image may be sent to the administrative plug-in 240.

The surrogate process 232 may be operating on the remote managed machine 103 and may perform certain operations in response to the administrative request for a screen capture. For instance, the surrogate process 232 may open an "interactive" window station and set the current process window station to the interactive window station. The surrogate process 232 may also open a "user input" desktop configured to receives user input and assign the user input desktop to the current operating thread. The surrogate process may also perform an image capture of the display driver device and shrinks the data content to the desired thumbnail size (horizontal and vertical constraints). Lastly, the screen capture image is converted into a compressed image format.

An example procedure that may be executed by the server process 231 upon receiving a request for a thumbnail may include various operations. Example operations may include determining a Windows logon session to use for obtaining the screen capture, locating an existing process already running in that logon session and duplicating its token (e.g., permissions, credentials, etc.), running a child process (i.e., the surrogate process 232) to capture the screen to an image file. Other operations may include the child process reducing the screen capture image to the requested thumbnail size and then exiting. The server process 231 sends the thumbnail image back to the administrator plug-in.

A request for a thumbnail is sent to the server process 231 by the administrator plug-in 240. The request message may include the desired thumbnail image size (the vertical and horizontal extent in pixels). When the server process 231 receives the request, a determination is made as to what user logon session to obtain the screen capture from, since there may be more than one session currently operating on the managed machine 103. For example, one or more of the following may be true: a user is logged in at the physical machine (the console session), a user is logged in at the physical machine (the console session) but the screen-saver is active, a user may be connected remotely, on Windows Servers, multiple users may be connected remotely, no-one is logged in and the physical console is locked, etc. Any of these present operating conditions should be identified and compared to the desired operating conditions included in the request for a screen capture. If the comparison does not match additional screen capture operations may be performed to satisfy the request.

An example of the logic used to determine the target logon session may include, "If" (operating system is XP/2003)—"Then" target logon session is the first active session (the first session for which session state is Active)—"Else" target logon session is the active console session (the session that is attached to the physical console)—"End." The logic may instead be to simply obtain the thumbnail of the current console session (i.e. whatever is displayed on the monitor).

Once the server process 231 has identified the target logon session consistent with the request, the server process 231 must now obtain a screen capture. However, since the server process 231 may be operating as a Windows sever it may always be in session "0", which may not match the target session. Due to the "session isolation" imposed by the current versions of the Windows operating system (Vista®, Windows 7®, Server 2008®), the server process 231 may not be able to interact with the user-interface, preventing it from being able to capture the screen. To circumvent the inability to capture the screen, the server process 231 must run the child process or surrogate process 232 which it is able to launch into any session. For example, if the target session were session "3", it can launch the surrogate child process 232 into session "3."

Before launching the surrogate process 232, however, the server process 231 must ensure that the surrogate process 231 will run with all of the permissions and privileges required in that session. The server process 231 finds another process that is already currently running in the target session and then duplicates its permissions and privileges represented by a token. The server process does not select any process, but instead looks for the 'winlogon.exe' process, which is a Windows system process that always runs in every session and happens to have all the permissions needed. As a result, the server process 231 duplicates the token of the 'winlogon' process that is in the target session, and then launches the surrogate child process 232 with that same token.

Once the surrogate process 232 is running, it will copy whatever is displayed on the screen of the display device 233 to an image file. For each logon session there are multiple desktops. The one that the user sees on the screen is called the 'user-input' desktop. The surrogate process 232 opens the interactive window station and the user-input desktop to allow itself to interact with the user-interface.

To capture the screen, the surrogate process 232 makes a copy of the display driver device context, which contains the pixels that should be displayed on whatever display is configured, to a bitmap image in memory. The bitmap image is then shrunk to the thumbnail size requested by the administrator plug-in 240 as specified as a horizontal and vertical pixel size. The shrunken bitmap image is then converted to a compressed image format (JPEG). The thumbnail image is then made available to the server Process 231. The server process 231 obtains the thumbnail image and sends it back to the administrator plug-in 240.

According to example embodiments of the present invention, the screen capture operation is provided to the administrator remotely in the context of a live connect session that is established to communicate the screen capture thumbnail data. The screen capture related commands and their corresponding responses are encoded as JavaScript object notation messages (JSON), which are used to represent simple data structures and associative arrays or objects. JSON is language-independent and uses parsing which provides interoperability of different programming languages and their corresponding operating environments. The JSON messages are created and sent over transmission control protocol (TCP) using a relayed or P2P connection. The messages are exchanged over the existing channel established by an agent, server, and/or browser.

Figure 4:
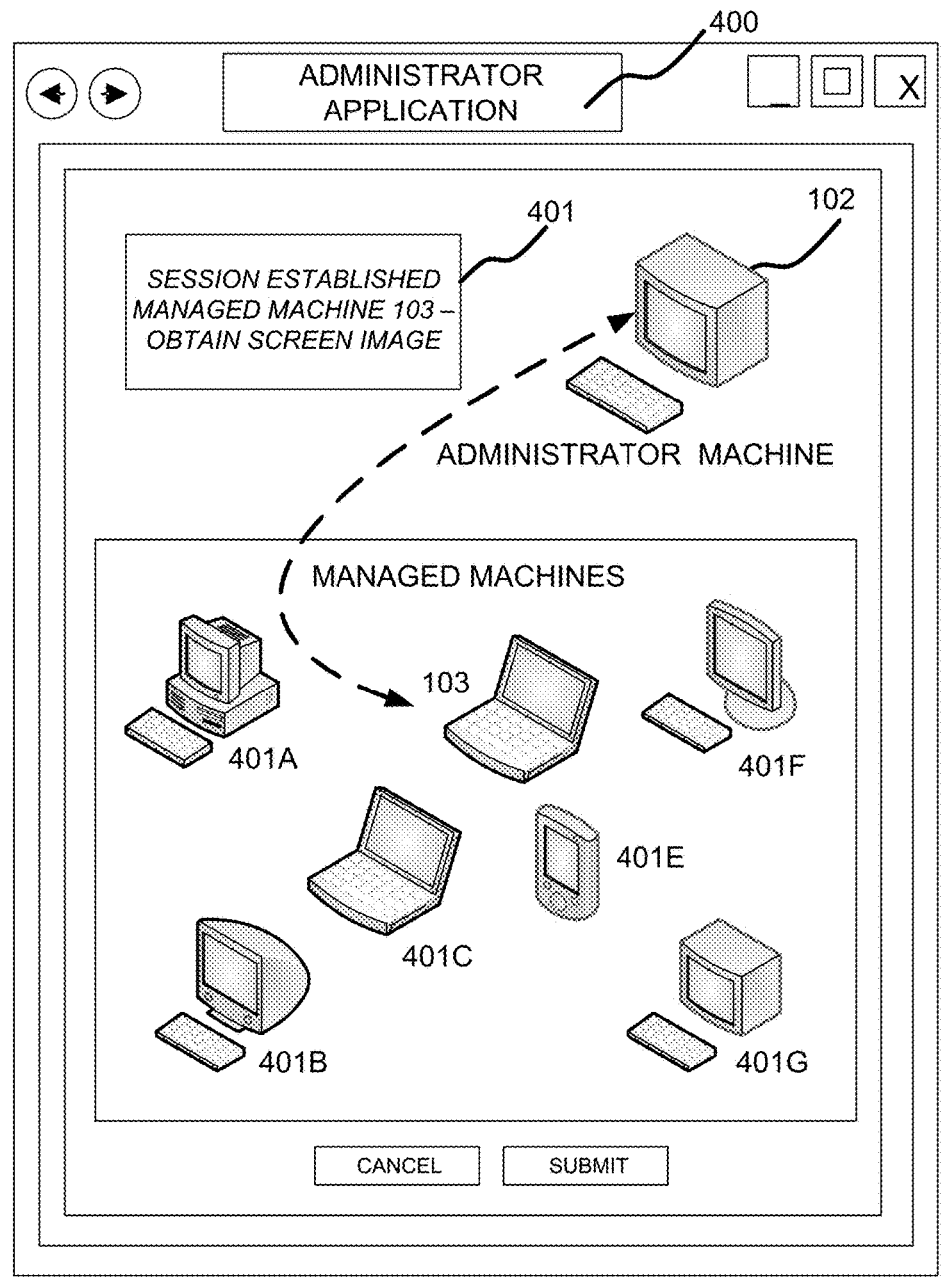
FIG. 4 illustrates an example graphical user interface (GUI) administrator web application according to an example embodiment of the present invention.

FIG. 4 illustrates an example GUI that may be used by the administrator to access the screen capture operation, according to example embodiments of the present invention. Referring to FIG. 4, the administrator application 400 provides an interface to view the administrator machine 400 and the various network components of the managed network (103, 401A-401G, etc.). The administrative network configuration may provide support for all types of managed machines. For example machines 401A-401G includes examples of computers, laptops, PDAs, tablet PCs, smart phones, etc., each of which may be capable of establishing a network connection to the administrator server and receiving support from the remote command prompt. After a secure connection and authorization has been established to the managed computer 103, screen capture selection option 401 may appear as a window on the administrator's GUI space, which may be used to enter commands directly.

Figure 5:
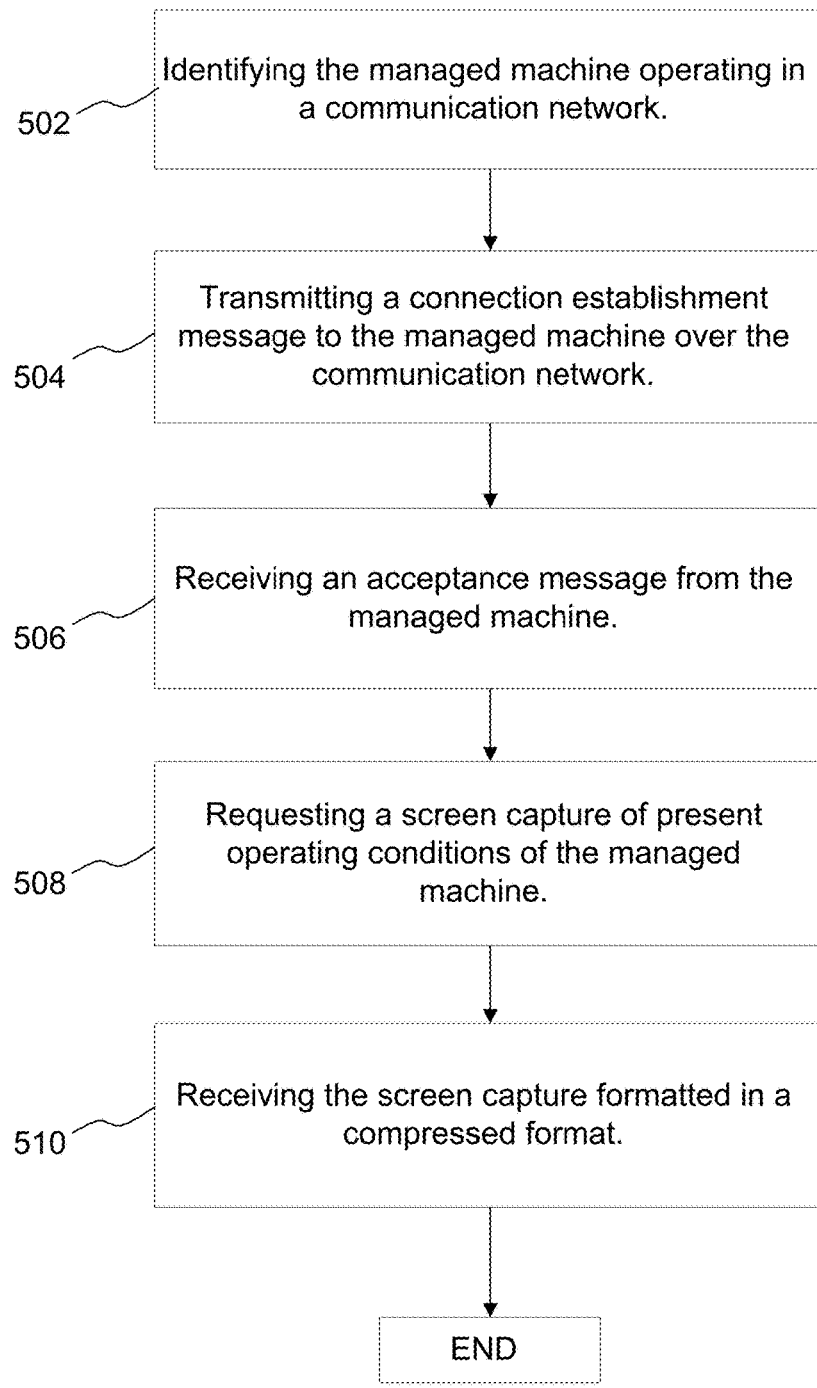
FIG. 5 illustrates a flow diagram of an example method according to an example embodiment of the present invention.

One example method of remotely communicating with a managed machine is illustrated in the flow diagram of FIG. 5. Referring to FIG. 5, the method may include identifying the managed machine operating in a communication network, at operation 502. The method may include transmitting a connection establishment message to the managed machine over the communication network, at operation 504, receiving an acceptance message from the managed machine, at operation 506 and requesting a screen capture of present operating conditions of the managed machine, at operation 508 and receiving the screen capture formatted in a compressed format, at operation 510.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103.

Figure 6:
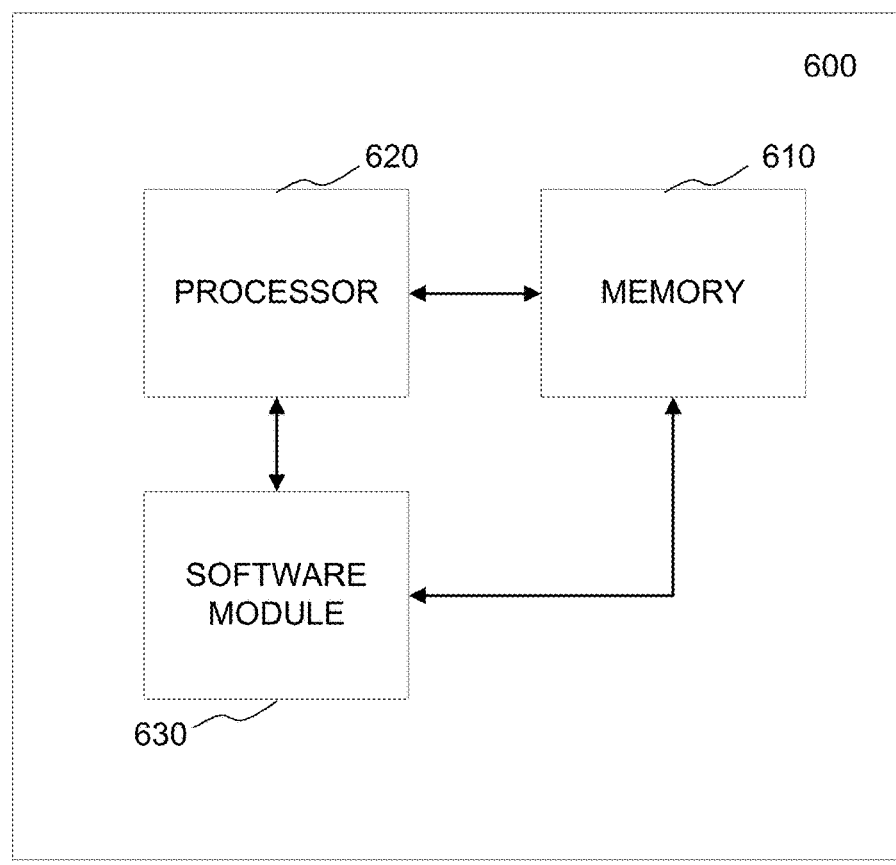
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of remotely communicating with a managed machine, the method comprising:
   transmitting a connection establishment message to a managed machine over a communication network;
   transmitting a request for a screen capture of present operating conditions of the managed machine via a server process, wherein the request comprises a thumbnail image size used for processing the screen capture;
   initializing a surrogate process on the managed machine responsive to the transmitted request, wherein the surrogate process is operating on behalf of the server process;
   performing the screen capture via the surrogate process;
   initiating a user input desktop operation via the surrogate process, wherein the user input desktop operation receives user input and assigns the user input to a currently operating thread; and
   receiving the screen capture formatted in a compressed format via the server process.

2. The method of claim 1, wherein transmitting a connection establishment message to the managed machine comprises an administrator plug-in application initiating the connection establishment message via a secure channel to a server process executing on the remote managed machine.

3. The method of claim 2, wherein the transmitted connection establishment message is received at a server process executing on the managed machine.

4. The method of claim 1, wherein the compressed format is a thumbnail version of the screen capture.

5. The method of claim 1, further comprising:
receiving an acceptance message from the managed machine;
transmitting another connection establishment message to the managed machine over the communication network;
receiving another acceptance message from the managed machine;
requesting an updated screen capture of present operating conditions of the managed machine;
receiving the updated screen capture formatted in a compressed format; and
replacing the original screen capture with the updated screen capture.

6. The method of claim 2, further comprising:
creating a thumbnail compressed version of the screen capture via the surrogate process; and
transferring the thumbnail to an administrator application operating on a remote computer.

7. The method of claim 1, further comprising identifying one active session among a plurality of active sessions from which to obtain the screen capture.

8. An apparatus configured to remotely communicate with a managed machine, the apparatus comprising:
a transmitter configured to transmit a connection establishment message to a managed machine over a communication network; and
a processor configured to:
request a screen capture of present operating conditions of the managed machine via a server process, wherein the request comprises a thumbnail image size used to process the screen capture;
initialize a surrogate process on the managed machine responsive to the transmitted request, wherein the surrogate process operates on behalf of the server process;
perform the screen capture via the surrogate process;
initiate a user input desktop operation via the surrogate process, wherein the user input desktop operation receives user input and assigns the user input to a thread that is currently operational; and
receive the screen capture formatted in a compressed format via the server process.

9. The apparatus of claim 8, wherein the transmitter configured to transmit a connection establishment message to the managed machine utilizes an administrator plug-in application to initiate the connection establishment message via a secure channel to a server process that executes on the remote managed machine.

10. The apparatus of claim 9, wherein the transmitted connection establishment message is received at a server process that executes on the managed machine.

11. The apparatus of claim 8, wherein the compressed format is a thumbnail version of the screen capture.

12. The apparatus of claim 8, wherein a receiver is configured to receive an acceptance message from the managed machine, the transmitter is further configured to transmit another connection establishment message to the managed machine over the communication network, and the receiver is further configured to receive another acceptance message from the managed machine, and the processor is further configured to request an updated screen capture of present operating conditions of the managed machine, receive the updated screen capture formatted in a compressed format, and replace the original screen capture with the updated screen capture.

13. The apparatus of claim 9, wherein the processor is further configured to create a thumbnail compressed version of the screen capture via the surrogate process, and transfer the thumbnail to an administrator application that operates on a remote computer.

14. The apparatus of claim 8, wherein the processor is further configured to identify one active session among a plurality of active sessions from which to obtain the screen capture.

15. A non-transitory computer readable storage medium configured to store instructions that when executed cause a processor to perform remotely communicating with a managed machine, the processor being further configured to perform:
transmitting a connection establishment message to a managed machine over a communication network;
transmitting a request for a screen capture of present operating conditions of the managed machine via a server process, wherein the request comprises a thumbnail image size used for processing the screen capture;
initializing a surrogate process on the managed machine responsive to the transmitted request, wherein the surrogate process is operating on behalf of the server process;
performing the screen capture via the surrogate process;
initiating a user input desktop operation via the surrogate process, wherein the user input desktop operation receives user input and assigns the user input to a currently operating thread; and
receiving the screen capture formatted in a compressed format via the server process.

16. The non-transitory computer readable storage medium of claim 15, wherein transmitting a connection establishment message to the managed machine comprises an administrator plug-in application initiating the connection establishment message via a secure channel to a server process executing on the remote managed machine.

17. The non-transitory computer readable storage medium of claim 16, wherein the transmitted connection establishment message is received at a server process executing on the managed machine.

18. The non-transitory computer readable storage medium of claim 15, wherein the compressed format is a thumbnail version of the screen capture.

19. The non-transitory computer readable storage medium of claim 15, wherein the processor is further configured to perform:
receiving an acceptance message from the managed machine;
transmitting another connection establishment message to the managed machine over the communication network;
receiving another acceptance message from the managed machine;
requesting an updated screen capture of present operating conditions of the managed machine;
receiving the updated screen capture formatted in a compressed format; and
replacing the original screen capture with the updated screen capture.

20. The non-transitory computer readable storage medium of claim 16, wherein the processor is further configured to perform:
   creating a thumbnail compressed version of the screen capture via the surrogate process; and
   transferring the thumbnail to an administrator application operating on a remote computer.

* * * * *